(12) United States Patent
Asplund

(10) Patent No.: US 6,293,470 B1
(45) Date of Patent: Sep. 25, 2001

(54) SMARTCARD AND METHOD FOR ITS MANUFACTURE

(75) Inventor: Johan Asplund, Stockholm (SE)

(73) Assignee: Swedish Advanced Technology Systems AB, Stockholm (SE)

( * ) Notice: Subject to any disclaimer, the term of this patent is extended or adjusted under 35 U.S.C. 154(b) by 0 days.

(21) Appl. No.: 09/430,252

(22) Filed: Oct. 29, 1999

Related U.S. Application Data

(63) Continuation of application No. PCT/SE98/00798, filed on Apr. 29, 1998.

(30) Foreign Application Priority Data

Apr. 29, 1997 (SE) .................................................. 96701612

(51) Int. Cl.[7] .................................................. G06K 19/00
(52) U.S. Cl. ........................... 235/487; 235/492; 361/737
(58) Field of Search ...................................... 235/487, 492, 235/441; 361/737, 761

(56) References Cited

U.S. PATENT DOCUMENTS

| | | | |
|---|---|---|---|
| 4,719,140 | 1/1988 | Hara et al. ........................... | 235/492 |
| 4,727,246 | 2/1988 | Hara et al. ........................... | 235/492 |
| 5,042,145 | 8/1991 | Boucquet .............................. | 29/840 |
| 5,519,201 | 5/1996 | Templeton, Jr. et al. ............ | 235/492 |
| 5,581,445 | 12/1996 | Horejs, Jr. et al. .................. | 361/739 |
| 5,671,525 | * 9/1997 | Fidalgo ................................ | 235/488 |
| 5,673,179 | * 9/1997 | Horejs, Jr. et al. .................. | 361/737 |
| 5,682,027 | * 10/1997 | Bertina et al. ....................... | 235/382 |
| 6,019,284 | * 2/2000 | Freeman et al. ..................... | 235/380 |
| 6,036,797 | * 3/2000 | Kanazawa et al. .................. | 156/82 |

FOREIGN PATENT DOCUMENTS

| | | |
|---|---|---|
| 195 07 144 | 4/1996 | (DE) . |
| 0 640 940 | 3/1995 | (EP) . |
| 2 279 611 | 1/1995 | (GB) . |
| 2 294 899 | 5/1996 | (GB) . |

* cited by examiner

*Primary Examiner*—Karl D. Frech
*Assistant Examiner*—Daniel St. Cyr
(74) *Attorney, Agent, or Firm*—Young & Thompson

(57) ABSTRACT

A method for manufacturing a multilayer "smart" card and card made by the method include a flexible, conducting connection between a microprocessor and internal circuitry that are encapsulated between two carrier layers of flexible, resilient, heat-resistant material, such PET or PEN. The card may include an LCD display.

10 Claims, 7 Drawing Sheets

SMARTCARD AND METHOD FOR ITS MANUFACTURE

This application is a continuation of international application PCT/SE98/00798 filed Apr. 29, 1998, which designated the United States.

INTRODUCTION

The present invention relates to a smartcard, particularly a smartcard with an integrated LCD display unit and browse buttons, that fulfils the criteria of ISO 7816 and a method for the manufacture of such a smartcard. The present invention also relates to an apparatus for performing the manufacturing procedure.

Smart cards are small electronic devices composing a processor and an electronic data memory, the contents of which may be modified through the processor by an external card accessing device. The processor provides processing capabilities which can include encryption of stored data, identification functions and the like. They are increasingly used in place of more traditional transaction cards (e.g. credit or identification cards) in which data are recorded on a magnetic strip. Smart cards have a larger storage capacity than magnetic strip cards which do not have a processor and therefore cannot process stored information.

Recently so-called general purpose smart cards have been disclosed which have a display and a user control means such as a keypad. They have the advantage, compared with the ordinary smart cards, that they do not need specific terminal equipment for referencing their contents and inputting data. These smartcards can be used in many different everyday situations in areas such as, for example, payment, service, health care, transport (as a voucher or a ticket), communication, identification and multipurpose.

In order to standardise smartcards an ISO standard, ISO 7816, has been drawn up for them. The standard ISO 7816 has 3 different parts:

ISO 7816-1 which defines the physical characteristics of the card.

ISO 7816-2 which defines dimension and contact position of the card.

ISO 7816-3 which defines the electrical signals and transmission protocols.

While it is relatively easy to arrange the contact positions and the electrical signals and protocols, it has previously been impossible to fulfil all the physical requirements of ISO 7816-1 and -2 for a smart card having a display and user control means. These, requirements include that:

the surface profile of card and contacts should be such that the difference in level between all contacts and the adjacent card surface shall be less than 0.1 mm;

the mechanical strength of the card and contacts should be such that the card shall resist damage to its surface and any components contained in it and shall remain intact during normal use, storage and handling.

the surface, and contact pins, must not be damaged by the pressure caused by a steel ball of 1.5 mm diameter on which is applied a force of 1.5 N, the electrical resistance measured between any two points of the contact pins must not be over 0.5 Ohm, with a current of from 50 $\mu$A to 300 mA;

the short ends of the card should be able to be flexed through a deformation of 2 cm measured from the centre of the card, at a rate of 30 bend per minute for 1000 bends without any cracks forming and without the card malfunctioning, the long sides of the card should be able to be flexed through a deformation of 1 cm measured from the centre of the card, at a rate of 30 bend per minute for 1000 bends without any cracks forming and without the card malfunctioning;

the card must be not more than 0.76 mm thick.

Thus the card must be strong, thin and flexible. In this context, flexible is defined as being able to fulfil the ISO 7816 requirements for flexibility as well as all the other ISO requirements. A card which fulfils all the requirements of ISO 7816 and which has a display and user control means will henceforth be called a super smart card. Cards containing processors but not fulfilling the requirements of ISO 7816 or lacking a display will be called general purpose cards, chip cards or smart cards.

Chipcards with displays and keypads are known from, for example, EP, A, 405 054, FR, A, 2731 537, JP, A, 7329462, WO, A, 9420929, U.S. Pat. No. 5,521,362 and "Low-power one-chip microcomputer with 64 Kbit EEPROM for smart card." Yaegawa, K.; Eby, M. D.; Kobayashi, M.; Takeuchi, W. Sharp Technical Journal (December 1991) no. 51, p.67–72. These cards also contain an internal power source. These cards are too thick and/or stiff to conform with the ISO 7816.

A prior art method for the manufacture of chip cards is disclosed in "New packaging technology of super smart card", Watahiki, S.; Ohta, S.; Murakami, A.; Inaba, T.; Takahashi, H. (Oki Electr, Ind. Co. Ltd., Japan) Sixth IEEE/CHMT International Electronic Manufacturing Technology, Symposium. Proceedings 1989 Japan IEMT Symposium (Cat. No.89CH2741-7), New York, N.Y., USA: IEEE, 1989 p.101–4, Conference: Nara, Japan, Apr. 26–28, 1989. In this method the processor ("chip"), which has 92 pins and a surface area of nearly 50 square mm, is mounted on a first printed circuit board, called a terminal board, by an outer lead bonding method. In this method each of the 92 pins on the chip is connected to different one of 92 leads on a circuit board surrounding the chip. This terminal board is then aligned with a second printed circuit board and connected to it by anisotropic adhesive. This second board is then joined together with a back film layer, a back panel, an adhesive film, a plurality of frame films, a hot melt film, a front panel and a front film to form a card. A problem with this method is that the anisotropic adhesive used is brittle and therefore can break if the card is flexed. The adhesive is formed of 30 $\mu$m diameter cores of low melting-point solder spaced at 80 $\mu$m centres. This limits its use to connecting components which are spaced at least 50 $\mu$m apart and hence it is not suitable for the current generation of microprocessors which have only 20 $\mu$m between pins. A further limitation with this method is that the large size of the chip means that it would be easily damaged if the card was sufficiently flexible to fulfil the ISO 7816 requirements. To avoid these problems the cards have to be made stiff i.e. they have limited flexibility and cannot fully conform with the ISO 7816 standard.

Thus no card with a display has been disclosed in the prior art which can fulfil all the requirements of ISO 7816 regarding strength and flexibility while also fulfilling the dimensional limitations, particularly in thickness, imposed by said standard.

An object of the present invention is to produce a thin, flexible and strong super smartcard (i.e a card with a processor, display and user control means) which can work properly and withstand, without cracking or malfunctioning, the stress of everyday situations which include, for example, bending of the card and subjecting it to pressure.

A further object of the present invention is to provide a method for manufacturing such super smart cards.

Another object of the invention is to provide an apparatus suitable for manufacturing such super smart cards.

SUMMARY OF THE INVENTION

The present invention solves the problem of how to provide a smartcard with a display and user control means such as browse buttons or a keypad, which is thin, strong and flexible. This is achieved by building a smart card of a number of thin layers of materials with specially selected physical properties and combining these layers with specially adapted, flexible assembly techniques.

The super smartcard manufactured in accordance with the present invention can conform to the ISO 7816 standard.

The invention will be described in more detail below with reference to examples of embodiments as shown in the appended drawings.

DETAILED DESCRIPTION OF EMBODIMENTS

Figure 1:
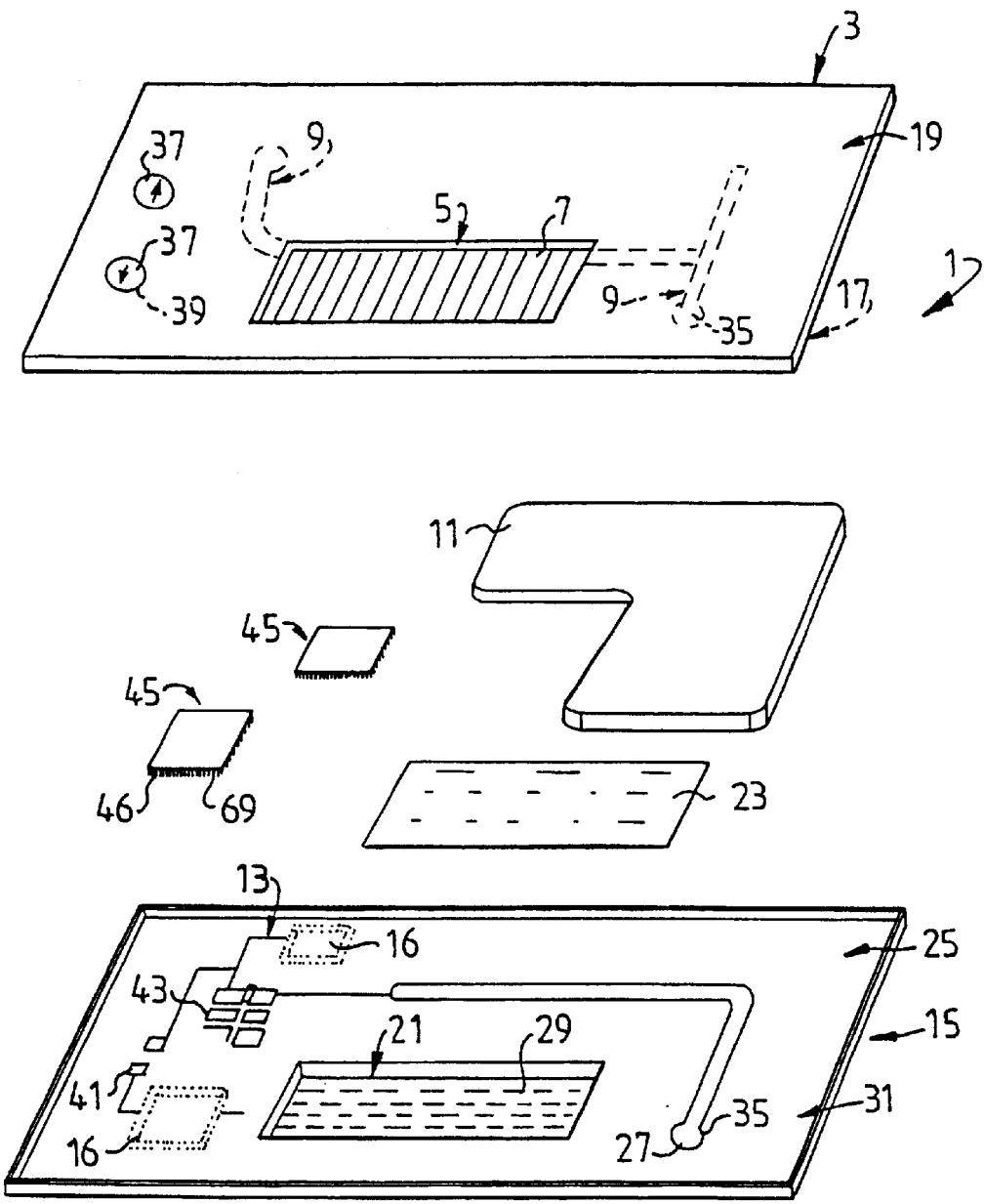
FIG. 1 shows schematically an exploded view of one embodiment of a smart card according to the invention.

As shown in FIG. 1 an example of an embodiment for a smart card 1, e.g. of super smart card type, is made up of a number of carrier layers of different materials. An outer carrier layer 3, which is here called the top layer 3 for the sake of clarity but which could be the bottom layer depending on the orientation of the smartcard 1, is made of a flexible, resilient, carrier material. Preferably the carrier material is a polyester such as PET which suitable for flexible designs and as carrier for ITO (indium tin oxide-a transparent conductive agent which makes LCD displays possible) and conductive circuits. While PET is cheap and readily available, it is not suitable for soldering as it cannot withstand any temperature higher than about 100° C. Top layer 3 has a window for a display 5 formed in it by leaving a portion of PET transparent and the rest of the top layer 3 is preferably made opaque or coloured or decorated by printing for aesthetic reasons. ITO 7 for the columns of the display, and conductive circuit tracks 9, made from copper, silver or any other suitable conductive material, for the additional circuitry connecting a power supply 11 to a main circuitry 13 on a bottom layer 15, are deposited onto the underside 17 of the top layer 3. If made of copper then the tracks 9 are preferably 10–30 μm thick. The upper side 19 of the top layer can be decorated as required.

In this embodiment a bottom layer 15 is made of flexible, resilient, heat-resistant carrier material which is suitable for flexible designs and as carrier for ITO and conductive circuits. An example of such a material is the polymer PEN such as the type known as GTS 5660 from GTS Flexible Materials Ltd, United Kingdom. PEN has a melting-point temperature of over 180° C. which, as this is above the melting-point of about 160° C. for low melting-point solder, allows the soldering and FlipChip bonding of components attached to it. By FlipChip bonding is meant a process where a chip is aligned with contacts on a surface, then placed with its solder coated pins in contact with the surface and bonded directly to the surface by soldering. PEN is furthermore suitable for use with other assembly methods that can be used with polymers. Other conceivable materials that could be used instead of PEN are epoxy or epoxy derivatives and also other polymers with similar characteristics to PEN and which can attach to conducting tracks. A cavity 21 for LCD fluid 23 is prepared, for example by embossing, in the upper side 25 of bottom layer 15 in a position corresponding to the position of display window 5 in the top layer. The cavity 21 is also preferably transparent in order to allow the display 5 to be read from either side of the card 1. Conductive tracks 27, made from copper, silver or any other suitable conductive material and preferably 10–30 μm thick in the case that they are made from copper, which form the main circuitry 13 of the smart card and ITO 29 for the rows of the display 5 are deposited on the upper side 25 of bottom layer 15. The cavity 21 is filled with LCD fluid 23 which in the assembled smart card 1 is in contact with the ITO columns 7 and rows 29 of the display 5. In order for the LCD 5 to function it must have polarising display windows and in the embodiment of the invention shown the PET and PEN materials are polarising. It is also possible to use non-polarising PET and/or PEN in which case a translucent polarising film would have to be applied to the window in the non-polarising material. Thus in this embodiment an LCD display 5 is constructed of 5–7 different layers:

top plastic carrier (top, at least partly transparent, PET layer 3);

translucent polarising film e.g. 105 μm thick (not shown and not required if top layer 3 is polarsing);

ITO columns 7 (for example, 5 columns per character);

LCD fluid 23 in cavity 21;

ITO rows 29 (for example, 7 rows per character);

translucent polarising film e.g. 175 μm thick (not shown and not required if bottom layer 15 is polarising);

Bottom plastic carrier (bottom, at least partly transparent, PEN layer 15).

In order to comply with ISO 7816 the total thickness of this display 5 must be equal to 0.76 mm (plus or minus the tolerances given in ISO 7816).

The power source 11, preferably in the form of a flexible, polymer-based (e.g. polymer-lithium) laminar battery of any desired shape, is mounted in between the top and bottom layers 3 resp. 15 at any desired location. The conductive circuitry 9, 13 on both top and bottom layers, by means of suitable plating, e,g. silver, aluminium or tin, form contacts 35 for the power source 11.

User control means, shown in this embodiment as a pair of browse buttons 37 made of domes formed in the top layer 5, are provided. These domes can be coated with carbon 39 and are positioned over corresponding contact pad areas 41 provided with a suitable number of poles (not shown) in the copper circuit 13 in the bottom layer 15. Any other suitable input means can also conceivably be used.

The card 1 is preferably provided with smartcard contacts 43, for example in the form of gold plated areas 43 in the bottom copper circuitry 13, in accordance with the ISO 7816 minimum requirements.

One or more microprocessors, shown here as microchips 45, according to the application for the card 1 (here two chips are shown), are integrated into the space between the top and bottom layers 3, 15. In this embodiment of the invention the pins 46 of the two chips 45 are attached to the underlying contacts 16 on the bottom layer 15 by flexible, conducting attachment means in the form low melting-point temperature solder 69 which melts at a temperature below the melting point of PEN.

Figure 2:
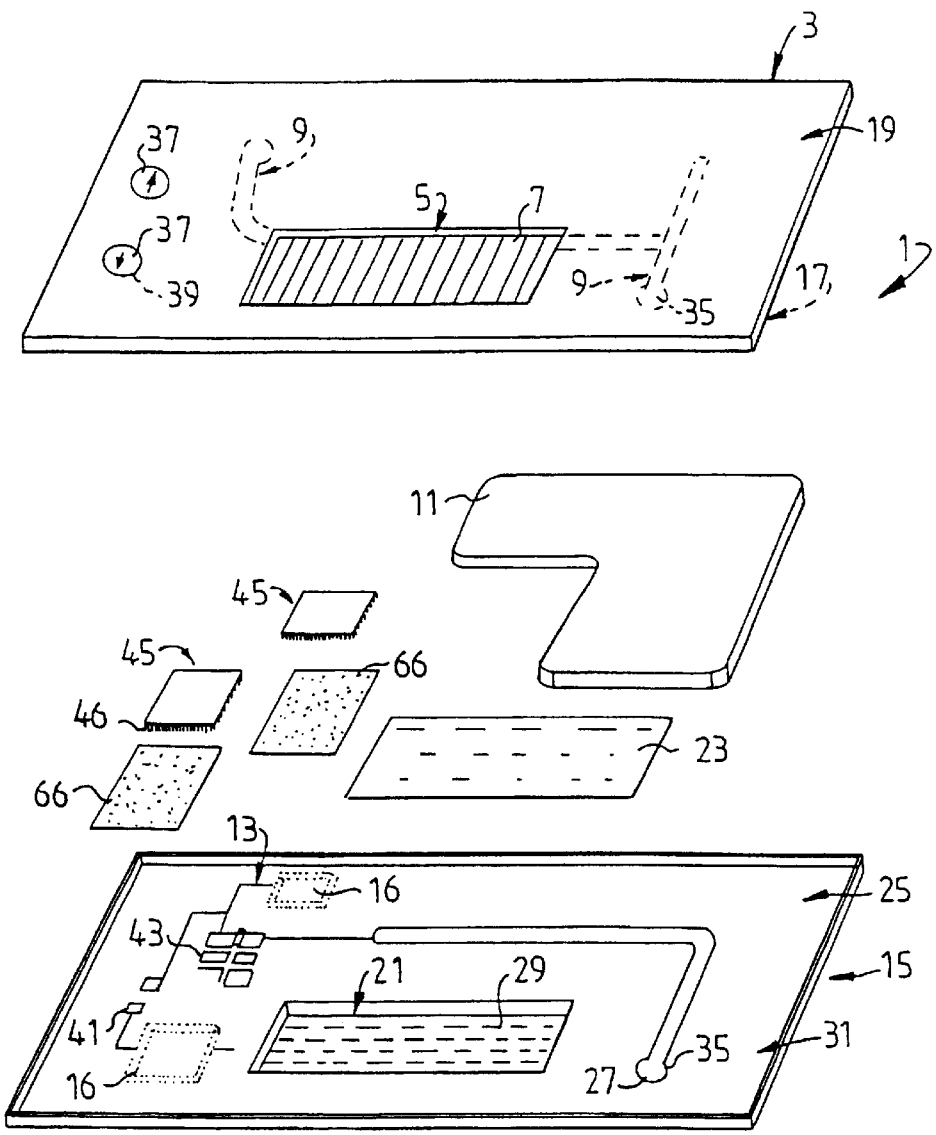
FIG. 2 shows schematically an exploded view of a second embodiment of a smart card according to the invention.

FIG. 2 shows a second embodiment of a super smartcard according to the invention in which the same reference numbers as used here as in FIG. 1 to refer to similar items. In this embodiment the chips 45 are attached to the underlying contacts by flexible, conducting attachment means in the form of a flexible anisotropic adhesive 66.

Figure 3:
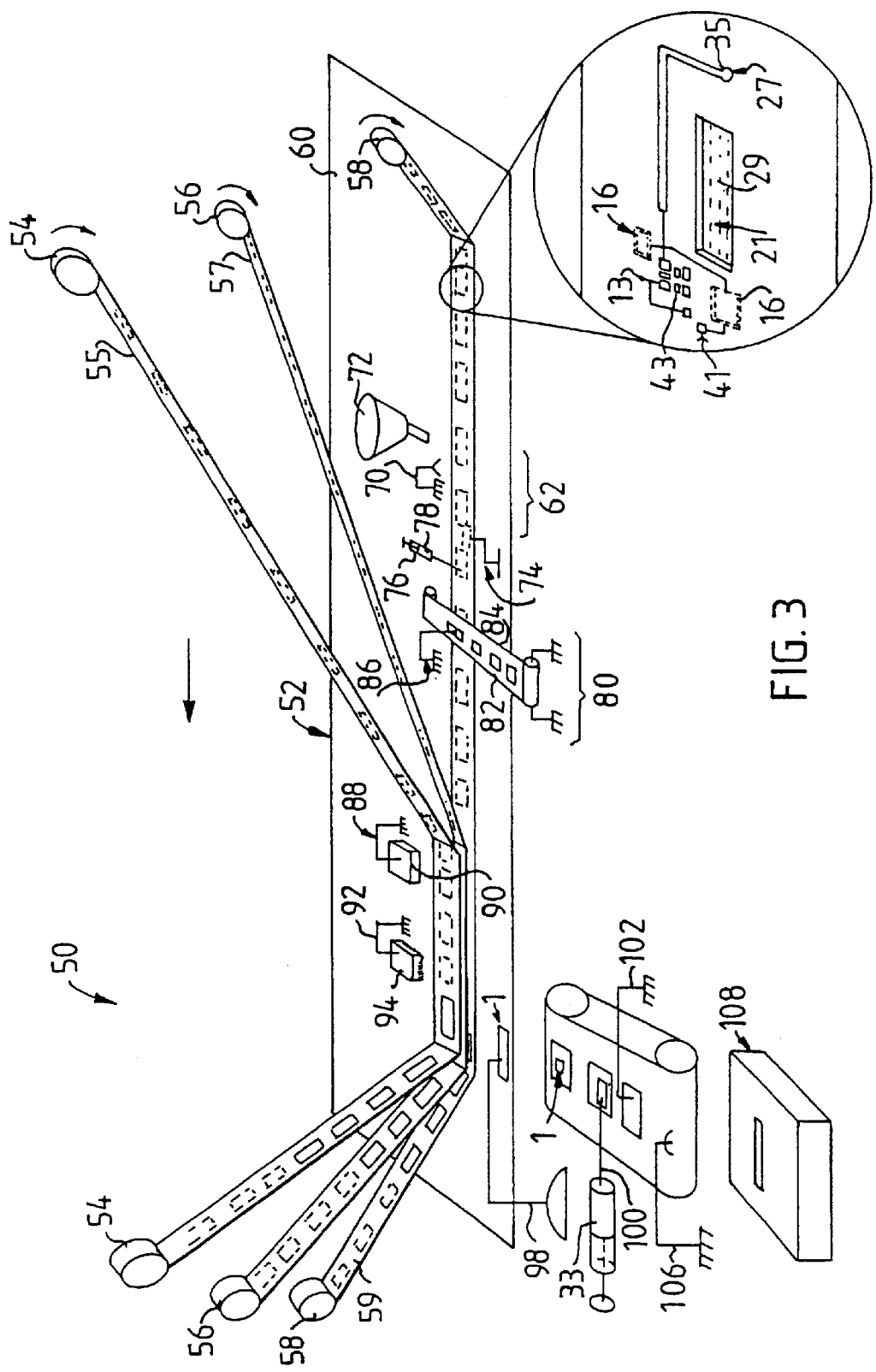
FIG. 3 shows schematically an apparatus for manufacturing a smart card according to the first embodiment of the invention.

In FIG. 3 an embodiment of an apparatus 50 for assembling a card according to the invention for manufacturing a card 1 is shown. Apparatus 50 comprises a surface mount machine 52 which is supplied with the pre-formed components which are comprised in a card 1 and automatically assembles them into complete cards. The apparatus has pairs of feed and take-up reels 54, 56, 58 which supply bands of material to the base assembly board 60.

The pair of reels 54 contain a band of polarising PET 55 which has been pre-processed, in ways known in the art and thus not described here, so that, on the underside 17 facing the base assembly board 60, ITO patterns 7, copper tracks 9 and browse buttons 37 have been formed.

The pair of reels 56 contain a pre-cut band of laminating adhesive 57 which is used to adhesive the top and bottom layers 3, 15 together. The pair of reels 58 contain a band 59 of polarising PEN which has been pre-processed in ways known in the art and thus not described here, so that on the upper side 25 facing away from the base assembly board 60, ITO patterns 29, copper tracks 13 and cavity 21 have been formed.

A first, high-precision, mounting station 62 is arranged to accurately mount the active components which have to be mounted with a high positional accuracy, in the case of the micro processors with an accuracy of in the order of 5 $\mu$m. Microchips 45 are "bumped", that is to say their pins 46 been pre-soldered with low melting-point solder 69. This low melting-point solder has a melting-point temperature which is less than the melting-point temperature of the carrier material and is flexible at the normal working temperatures envisaged for ISO 7816 smartcards. There are lifting means, shown schematically by 70, which lift the microchip or microchips 45 from a feed device 72 and accurately aligns them with, and places them on, the application areas 68. A heating tool 74 applies heat to the application areas 68, preferably from below i.e. through the PEN band 59, for a sufficiently long time, for example 2 seconds, so that the low-melting point solder melts and forms a good electrical contact with the circuitry 13. It is also conceivable to apply the heat from just above or both from above and below. The heat is applied at a temperature of around 160° C. which is less than the melting point of PEN. In order to strengthen the card it is preferable that an underfill dispenser 76 injects a setting, insulating fluid or flowable compound 78 in the space between the microchip(s) 45 and the underlying surface 25.

At a second mounting station 80 a band of lithium-polymer 82 is moved across the direction of movement of the bands 55, 57, 59 between bands 57 and 59. The side of the band 82 facing towards the PEN band 59 is at least partly covered with adhesive 84. A stamp of any desired shape, shown schematically by 86, stamps out a battery 11 from the band 82 and presses it against PEN band 59 in a predetermined battery position where there is corresponding circuitry 13. Adhesive 84 retains the battery 11 in position during subsequent processing.

The movement of the pairs of reels are synchronised, in ways well-known in the art and hence not described further, so that the pre-formed components on the different bands 55, 57, 59 are aligned when they pass under a third station 88 on the base assembly board 60. The card is laminated here. This is achieved by the aligned bands 55, 57, 59 being pressed together by a laminating tool, shown schematically by 90, which applies heat and pressure to the sandwiched top layer 3, laminating adhesive 57 and bottom layer 15. In this manner the outer layers 3, 15 are joined together and the battery 11, components 45 and cavity 21 for the LCD fluid 23 form a single unit 1.

At a fourth station 92 the card 1 is stamped out of the laminated band of plastics by a stamp, shown schematically by 94.

At a fifth station 96 LCD fluid 23 is injected into the cavity 21 for the LCD display. This is achieved, for example, by a vacuum lifter, shown schematically by 98, placing the stamped-out card 1 in a predetermined position and orientation. A dispenser means, for example a needle, shown schematically by 100, is inserted into cavity 21 and the fluid 23 is injected. The needle 100 is then withdrawn and a sealant tool, shown schematically by 102, applies sealant (not shown) to the small needle hole (not shown). The hardware of the card is now finished. Other conceivable methods for applying LCD into the card are also to let the LCD fluid drip into the cavity, if the cavity is open enough for it. Another method of applying LCD is to apply it in form of a thixotropic tape into the cavity which tape is then liquefied later by the addition of a catalyst.

At a sixth station 104 the card 1 is tested. The card 1 is lifted with a vacuum tool, shown schematically by 106, and inserted in a reader/encoder, shown schematically by 108. A test routine is then performed. Faulty cards are rejected and the rest are accepted for further software processing as required.

Figure 4:
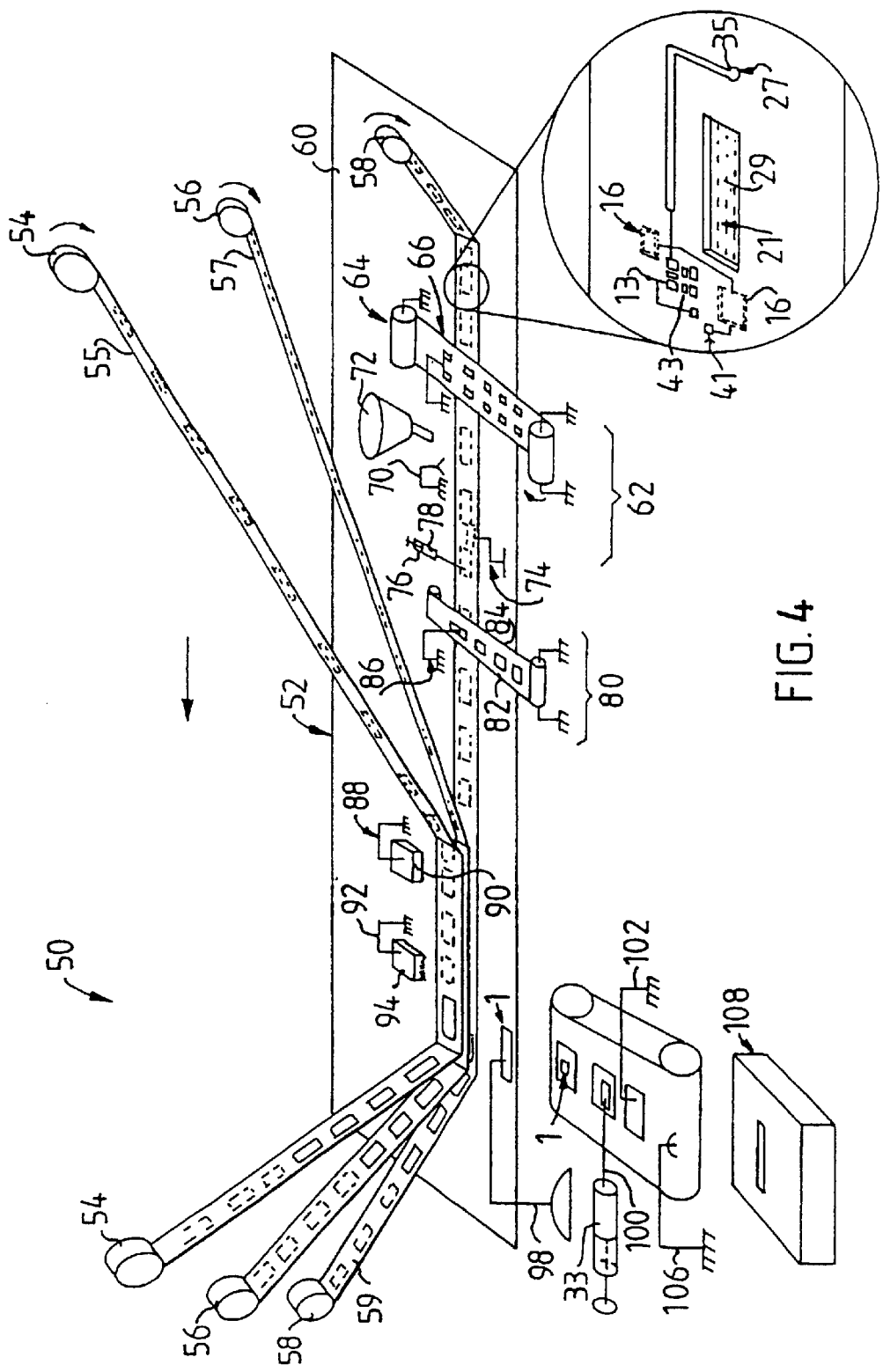
FIG. 4 shows schematically an apparatus for manufacturing a smart card according to the second embodiment of the invention.

FIG. 4 shows a second embodiment of an embodiment of an apparatus 50 for assembling a card according to the invention is shown. The same reference numbers as used here as in FIG. 3 to refer to similar items. This apparatus is similar to the apparatus shown in FIG. 3 with the addition of a further tool 64 at the first station 62. This station 62 has a flexible anisotropic tape applying means 64 which moves a band of anisotropic tape 66 across the direction of movement of the bands 55, 57, 59 between bands 57 and 59 and which applies anisotropic tape 66 over the application areas 68 for the microchip(s) 45. This flexible tape 66 has cores of conducting material spaced less than 20 $\mu$m apart. There are lifting means, shown schematically by 70, which lift the microchip or microchips 45 from a feed device 72 and aligns them with, and places them on, the application areas 68. A heating tool 74 applies heat to the application areas 68, preferably from below i.e. through the PEN band 59, for a sufficiently long time, for example 2 seconds, to form a good electrical contact with the circuitry 13. It is also to apply the heat from just above or both from above and below. The heat can be applied at a temperature of around 95° C. or less, depending on the type of adhesive and carrier material used.

In order to simplify the manufacturing process it is possible to use the anisotropic tape 66 as a replacement for the laminating adhesive 57 in which case the tape 66 would be applied on one or more of the surfaces to be laminated.

Figure 5A:
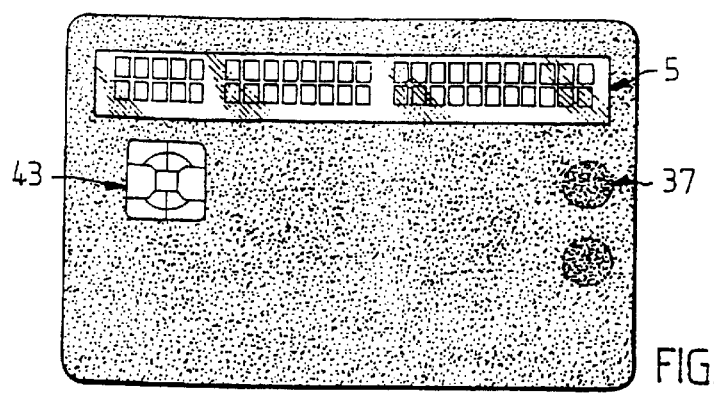
FIGS 5a) to 5l) show different embodiments of smart cards according to the invention.

FIGS. 5a) and 5b) show front and rear views of an embodiment of a possible layout of the display 5, browse buttons 37, and smart card contacts for a smart card according to the invention.

Figure 5B:
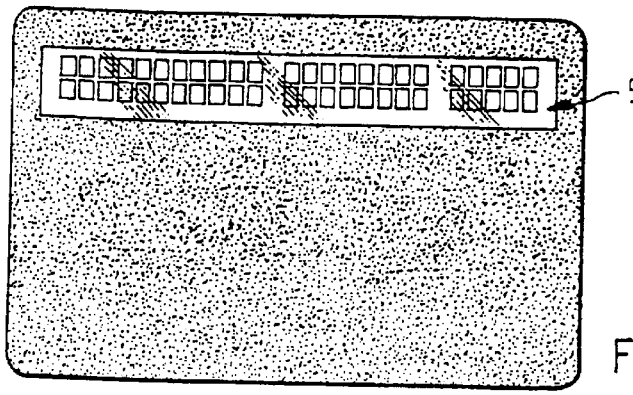
Figure 5C:
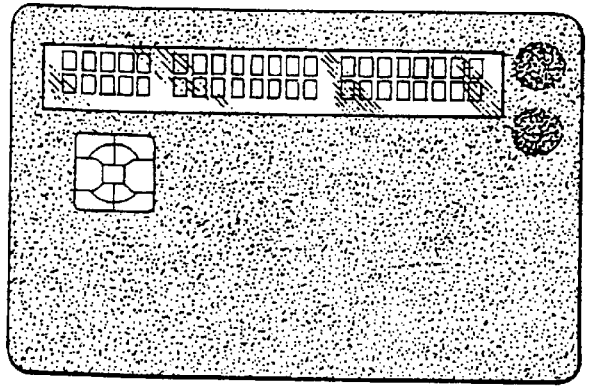
Figure 5D:
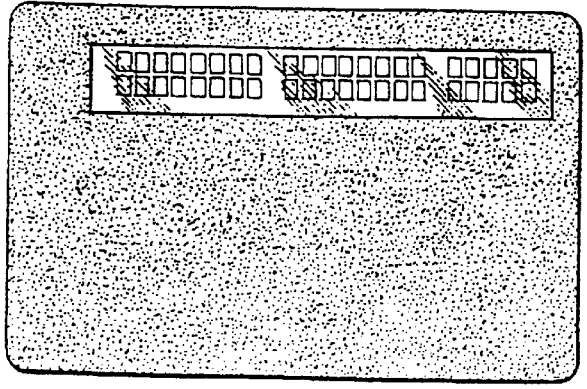
Figure 5E:
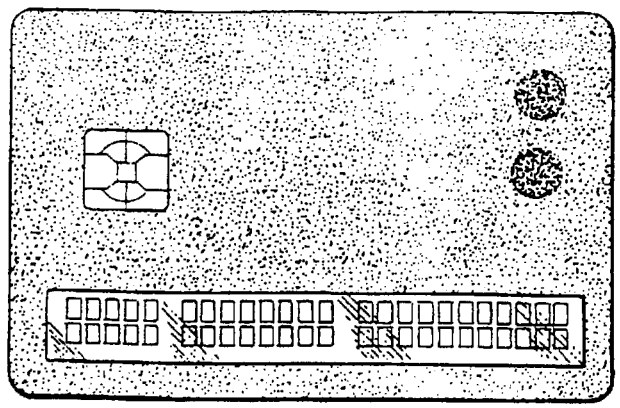
Figure 5F:
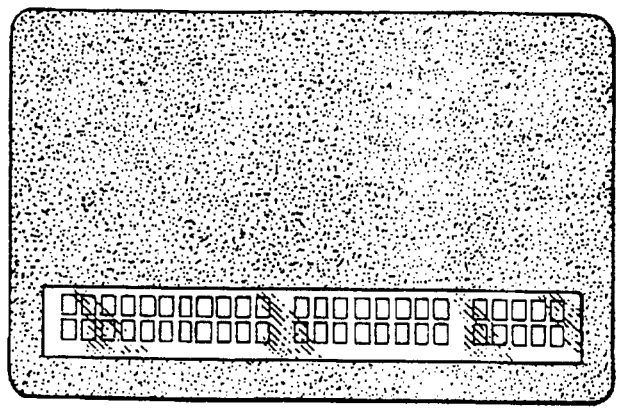
Figure 5G:
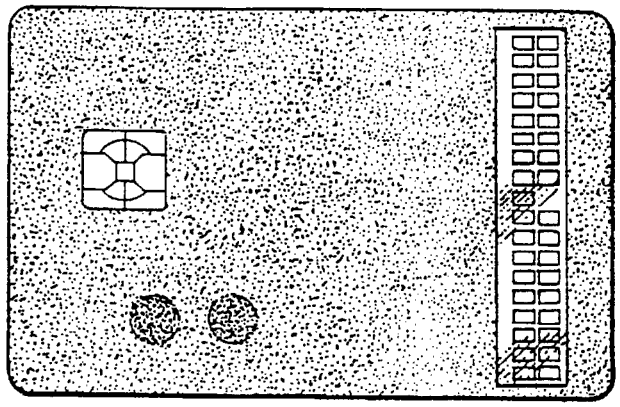
Figure 5H:
Figure 5I:
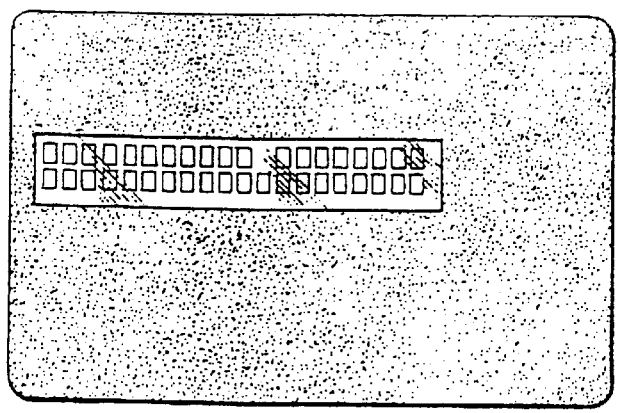
Figure 5J:
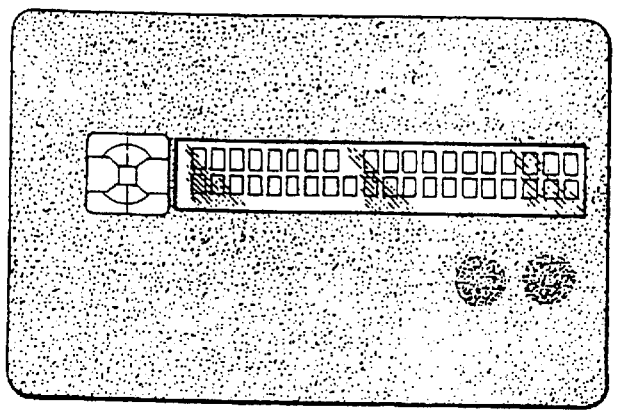
Figure 5K:
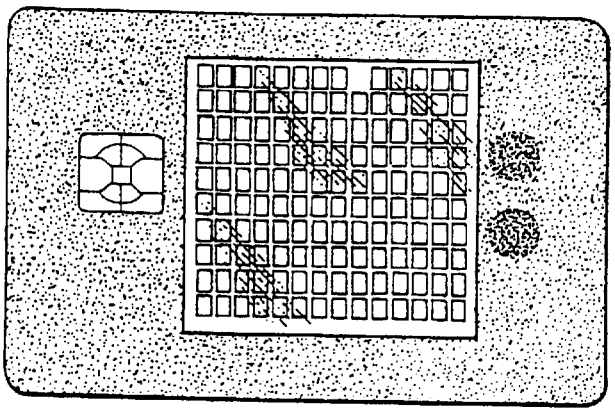
Figure 5L:
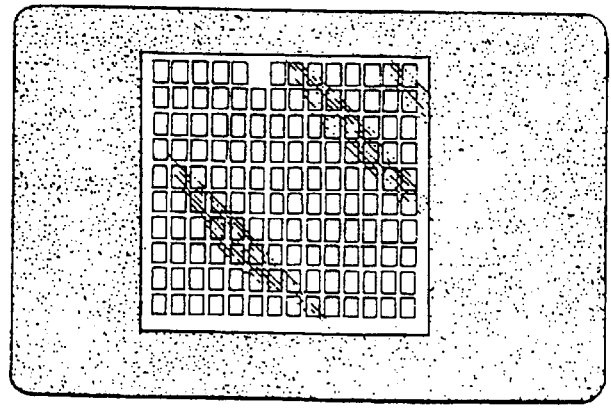

FIGS. 5b) to 5l) show other embodiments of conceivable layouts.

Naturally the invention is not intended to be limited to the embodiments show but may be varied within the scope of the claims, for example by omitting features which are not necessary for the particular use to which the card is to be put. Thus it may be possible to omit, for example, the display 5 or the browse buttons 37. It is furthermore possible to add more features such as, for example, one or more additional displays, buttons, batteries, audible signalling means or the like.

It is also conceivable that the display 5 could be formed from a plurality of small displays arranged for example in rows or columns to give the appearance of a large continuous display.

Although the apparatus and method for manufacturing a smartcard according to the invention has been described in terms of a single process chain, it is also possible to perform the method on a plurality of suitably arranged machines which can, if necessary, even be in different places.

Furthermore the tools, features and devices mentioned above are by way of example only and not as a limitation. They may be replaced by equivalent tools, features and devices as required.

What is claimed is:

1. A method for producing a flexible multi-layer card comprising active components and at least a top and a bottom carrier layer, comprising the steps of:

providing internal contacts on at least one of the carrier layers;

placing at least one of the active components as an internal active component integrated into the space between the top and the bottom layer;

providing flexible, conducting, attachment means between the internal contacts on the carrier layer provided with the internal contacts and the at least one internal active component;

positioning said at least one internal active component to an accuracy of 5 $\mu$m or less onto said contacts; and aligning a lithium-polymer band over an intended battery position on at least one of said carrier layers, and stamping out a battery shape from the lithium-polymer band and pressing the battery shape against said at least one carrier layer.

2. The method according to claim 1, wherein said flexible conducting attachment means is solder having a melting point temperature which is less than that of the melting point temperature of said carrier layer, and comprising the subsequent step of heating said solder to the solder melting point temperature.

3. The method according to claim 1, further comprising the step of applying heat to said solder through said carrier layer.

4. The method according to claim 1, further comprising the step of applying anisotropic adhesive between said contacts and said internal active component before the step of positioning the internal active component onto said contacts.

5. The method according to claim 1, further comprising the step of filling any space between at least one of the internal active components and said carrier layer with an insulating compound.

6. The method according to claim 1, wherein at least one of said carrier layers is a heat resistant polymer material.

7. The method according to claim 1, wherein at least one of said carrier layers is a polymer material.

8. The method according to claim 1, further comprising the following steps:

providing a base assembly means;

providing a number of feed and take-up reels supplying bands of material for a plurality of cards to said base assembly means;

the top and bottom carrier layer being provided on the outermost supply bands;

placing the supplying band having said carrier layers with said internal contacts as a bottom band on said base assembly means;

providing, facing towards the other bands, first indium tin oxide patterns for an LCD display, electrically conducting tracks and cavity for LCD-display in said bottom band;

placing secondly said active components aligned onto application areas on said bottom band and soldering them there;

providing, facing towards the other bands, first indium tin oxide patterns for an LCD display in said top band;

synchronizing the movement of said reels to align said pre-formed components on the different bands when passing an alignment station on said base assembly means;

laminating said bands at said alignment station to join said top and bottom carrier layers;

stamping out said card from said laminated band;

injecting LCD fluid into said cavity for LCD display; and sealing said cavity.

9. A method for producing a flexible multi-layer card comprising active components and at least a top and a bottom carrier layer, comprising the steps of:

providing internal contacts and conductive tracks on at least one of the carrier layers;

providing at least one of the active components in contact with at least some of said internal contacts;

forming one or more display cavities in registration with at least some of said internal conductive tracks in said carrier layers having conductive tracks;

positioning the flexible card before a dispenser means;

inserting the dispenser means into the display cavity;

injecting LCD fluid into the display cavity;

extracting the dispenser means from the display cavity; and applying sealant to the hole in the display cavity made by the dispenser means.

10. A method for producing a flexible multi-layer card comprising active components and at least a top and a bottom carrier layer, comprising the steps of:

providing internal contacts on at least one of the carrier layers;

placing at least one of the active components as an internal active component integrated into the space between the top and the bottom layer;

providing flexible, conducting, attachment means between the internal contacts on the carrier layer provided with the internal contacts and the at least one internal active component;

positioning said at least one internal active component to an accuracy of 5 µm or less onto said contacts;

providing a base assembly means;

providing a number of feed and take-up reels supplying bands of material for a plurality of cards to said base assembly means;

the top and bottom carrier layer being provided on the outermost supply bands;

placing the supplying band having said carrier layers with said internal contacts as a bottom band on said base assembly means;

providing, facing towards other bands, firstly first indium tin oxide patterns for an LCD display, electrically conducting tracks and cavity for LCD-display in said bottom band;

placing secondly said active components aligned onto application areas on said bottom band and soldering them there;

providing, facing towards other bands, second indium tin oxide patterns for an LCD display in said top band;

synchronizing movements of said reels to align said pre-formed components on different bands when passing an alignment station on said base assembly means;

laminating said bands at said alignment station to join said top and bottom carrier layers;

stamping out said card from said laminated band;

injecting LOCD fluid into said cavity for LCD display; and sealing said cavity.

* * * * *